US012597281B2

(12) United States Patent
Gu et al.

(10) Patent No.: US 12,597,281 B2
(45) Date of Patent: Apr. 7, 2026

(54) IMAGE AND SEMANTIC BASED TABLE RECOGNITION

(71) Applicant: ADOBE INC., San Jose, CA (US)

(72) Inventors: Jiuxiang Gu, Greenbelt City, MD (US); Vlad Morariu, Potomac, MD (US); Tong Sun, San Ramon, CA (US); Jason wen yong Kuen, Santa Clara, CA (US); Ani Nenkova, Philadelphia, PA (US)

(73) Assignee: Adobe Inc., San Jose, CA (US)

( * ) Notice: Subject to any disclaimer, the term of this patent is extended or adjusted under 35 U.S.C. 154(b) by 751 days.

(21) Appl. No.: 17/947,737

(22) Filed: Sep. 19, 2022

(65) Prior Publication Data

US 2024/0104951 A1 Mar. 28, 2024

(51) Int. Cl.
*G06V 30/412* (2022.01)
*G06V 30/262* (2022.01)
*G06V 30/414* (2022.01)

(52) U.S. Cl.
CPC .......... *G06V 30/412* (2022.01); *G06V 30/262* (2022.01); *G06V 30/414* (2022.01)

(58) Field of Classification Search
CPC .. G06V 30/262; G06V 30/412; G06V 30/414; G06V 10/82; G06V 10/806; G06N 20/00; G06N 3/0455; G06F 40/30; G06F 40/177
See application file for complete search history.

(56) References Cited

U.S. PATENT DOCUMENTS

2020/0097759 A1* 3/2020 Nadim .................. G06N 20/00

OTHER PUBLICATIONS

Zhang, et al. (Split, Embed, and Merge: An accurate table structure recognizer). (Year: 2022).*
Nassar, et al. (TableFormer: Table Structure Understanding with Transformers). (Year: 2022).*
Iida, et al. (TABBIE: Pretrained Representations of Tabular data (Year: 2021).*
Bodla, N., et al., "Soft-NMS—Improving Object Detection With One Line of Code", In Proceedings of the IEEE International Conference on Computer Vision, pp. 5561-5569 (2017).

(Continued)

*Primary Examiner* — Daniel G Mariam
(74) *Attorney, Agent, or Firm* — Shook, Hardy & Bacon L.L.P.

(57) ABSTRACT

In various examples, a table recognition model receives an image of a table and generates, using a first encoder of the table recognition machine learning model, an image feature vector including features extracted from the image of the table; generates, using a first decoder of the table recognition machine learning model and the image feature vector, a set of coordinates within the image representing rows and columns associated with the table, and generates, using a second decoder of the table recognition machine learning model and the image feature vector, a set of bounding boxes and semantic features associated with cells the table, then determines, using a third decoder of the table recognition machine learning model, a table structure associated with the table using the image feature vector, the set of coordinates, the set of bounding boxes, and the semantic features.

20 Claims, 8 Drawing Sheets

(56)         References Cited

OTHER PUBLICATIONS

Chi, Z., et al., "Complicated Table Structure Recognition", arXiv:1908. 04729v2, pp. 1-9 (Aug. 28, 2019).

Coüasnon, B., and Lemaitre, A., "Recognition of Tables and Forms", Handbook of Document Image Processing and Recognition, pp. 647-677 (2014).

Devlin, J., et al., "BERT: Pre-training of Deep Bidirectional Transformers for Language Understanding", Proceedings of NAACL-HLT, Association for Computational Linguistics, pp. 4171-4186 (Jun. 2-7, 2019).

Erhan, D., et al., "Scalable Object Detection using Deep Neural Networks", In Proceedings of the IEEE Conference on Computer Vision and Pattern Recognition, pp. 1-8 (2014).

Gao, L., et al., "ICDAR 2019 Competition on Table Detection and Recognition (cTDaR)", International Conference on Document Analysis and Recognition (ICDAR), pp. 1510-1515 (2019).

Göbel, M., et al., "ICDAR 2013 Table Competition", In 12th International Conference on Document Analysis and Recognition, pp. 1449-1453 (2013).

Hosang, J., et al., "Learning non-maximum suppression", In Proceedings of the IEEE Conference On Computer Vision and Pattern Recognition, pp. 4507-4515 (2017).

Hu, H., et al., "Relation Networks for Object Detection", In Proceedings of the IEEE Conference On Computer Vision and Pattern Recognition, pp. 3588-3597 (2018).

Hurst, M., "A Constraint-based Approach to Table Structure Derivation", Proceedings of the Seventh International Conference on Document Analysis and Recognition (ICDAR), IEEE Computer Society, vol. 2, pp. 1-5 (2003).

Itonori, K., "Table Structure Recognition based on Textblock Arrangement and Ruled Line Position", In Proceedings of 2nd International Conference on Document Analysis and Recognition (ICDAR), pp. 765-768 (1993).

Kieninger, T. G., "Table Structure Recognition Based On Robust Block Segmentation", German Research Center for Artificial Intelligence, pp. 1-11 (1998).

Lewis, M., et al., "BART: Denoising Sequence-to-Sequence Pretraining for Natural Language Generation, Translation, and Comprehension", arXiv:1910.13461v1, pp. 1-10 (Oct. 29, 2019).

Lin, T-Y., et al., "Focal Loss for Dense Object Detection", In Proceedings of the IEEE International Conference on Computer Vision, pp. 2980-2988 (2017).

Long, J., et al., "Fully Convolutional Networks for Semantic Segmentation", In Proceedings of the IEEE International Conference on Computer Vision and Pattern Recognition, pp. 3431-3440 (2015).

Lüscher, C., et al., "RWTH ASR Systems for LibriSpeech: Hybrid vs Attention—w/o Data Augmentation", arXiv:1905.03072v3, pp. 1-5 (Jul. 25, 2019).

Parmar, N., et al., "Image Transformer", Proceedings of the 35th International Conference on Machine Learning (PMLR), pp. 1-10 (2018).

Pawlik, M., and Augsten, N., "Tree edit distance: Robust and memory-efficient", Information Systems, pp. 1-17 (Aug. 22, 2015).

Radford, A., et al., "Language Models are Unsupervised Multitask Learners", OpenAI Blog, vol. 1, No. 8, pp. 1-24 (2019).

Raja, S., et al., "Table Structure Recognition using Top-Down and Bottom-Up Cues", arXiv:2010.04565v1, pp. 1-38 (Oct. 9, 2020).

Redmon, J., et al., "You Only Look Once: Unified, Real-Time Object Detection", In Proceedings of the IEEE Conference on Computer Vision and Pattern Recognition, pp. 779-788 (2016).

Ren, S., et al., "Faster R-CNN: Towards Real-Time Object Detection with Region Proposal Networks", Advances in Neural Information Processing Systems (NIPS), pp. 1-9 (2015).

Schreiber, S., et al., "DeepDeSRT: Deep Learning for Detection and Structure Recognition of Tables in Document Images", In 14th IAPR International Conference on Document Analysis and Recognition (ICDAR), vol. 1, pp. 1-6 (2017).

Siddiqui, S. A., et al., "Rethinking Semantic Segmentation for Table Structure Recognition in Documents", In International Conference on Document Analysis and Recognition (ICDAR), pp. 1-6 (2019).

Tensmeyer, C., et al., "Deep Splitting and Merging for Table Structure Decomposition", International Conference on Document Analysis and Recognition (ICDAR), pp. 114-121 (2019).

Zhang, S., et al., "Bridging the Gap Between Anchor-based and Anchor-free Detection via Adaptive Training Sample Selection", In Proceedings of the IEEE/CVF Conference on Computer Vision and Pattern Recognition, pp. 9759-9768 (2020).

Zhong, X., et al., "Image-based table recognition: data, model, and evaluation", Computer Vision—ECCV, pp. 1-17 (2020).

Zhou, X., et al., "Objects as Points", arXiv:1904.07850v2, pp. 1-12 (Apr. 25, 2019).

* cited by examiner

300

MASKED OCR TOKEN TASK
302

| | Projected Sales (in millions) | | |
| --- | --- | --- | --- |
| | 6-month (7/20-12/20) | 12-month (7/20-6/21) | 18-month (7/20-12/21) |
| Northwest Region | | | |
| In-Store | 1.34 | 2.80 | 4.35 |
| Web-based | ▓▓▓ | 4.51 | 6.80 |
| Overall | 3.93 | 7.95 | 12.18 |
| West Region | | | |
| In-Store | 2.20 | 4.51 | 6.99 |
| Web-based | 5.73 | 11.75 | 18.21 |

312

SPLIT DENOISING TASK
304

| | Projected Sales (in millions) | | |
| --- | --- | --- | --- |
| | 6-month (7/20-12/20) | 12-month (7/20-6/21) | 18-month (7/20-12/21) |
| Northwest Region | | | |
| In-Store | 1.34 | 2.80 | 4.35 |
| Web-based | 2.24 | 4.51 | 6.80 |
| Overall | 3.93 | 7.95 | 12.18 |
| West Region | | | |
| In-Store | 2.20 | 4.51 | 6.99 |
| Web-based | 5.73 | 11.75 | 18.21 |

MERGE DENOISING TASK
306

| | Projected Sales (in millions) | | |
| --- | --- | --- | --- |
| | 6-month (7/20-12/20) | 12-month (7/20-6/21) | 18-month (7/20-12/21) |
| Northwest Region | | | |
| In-Store | 1.34 | 2.80 | 4.35 |
| Web-based | 2.24 | 4.51 | 6.80 |
| Overall | 3.93 | 7.95 | 12.18 |
| West Region | | | |
| In-Store | 2.20 | 4.51 | 6.99 |
| Web-based | 5.73 | 11.75 | 18.21 |

TABLE ROTATION TASK
308

| | Projected Sales (in millions) | | |
| --- | --- | --- | --- |
| | 6-month (7/20-12/20) | 12-month (7/20-6/21) | 18-month (7/20-12/21) |
| Northwest Region | | | |
| In-Store | 1.34 | 2.80 | 4.35 |
| Web-based | 2.24 | 4.51 | 6.80 |
| Overall | 3.93 | 7.95 | 12.18 |
| West Region | | | |
| In-Store | 2.20 | 4.51 | 6.99 |
| Web-based | 5.73 | 11.75 | 18.21 |

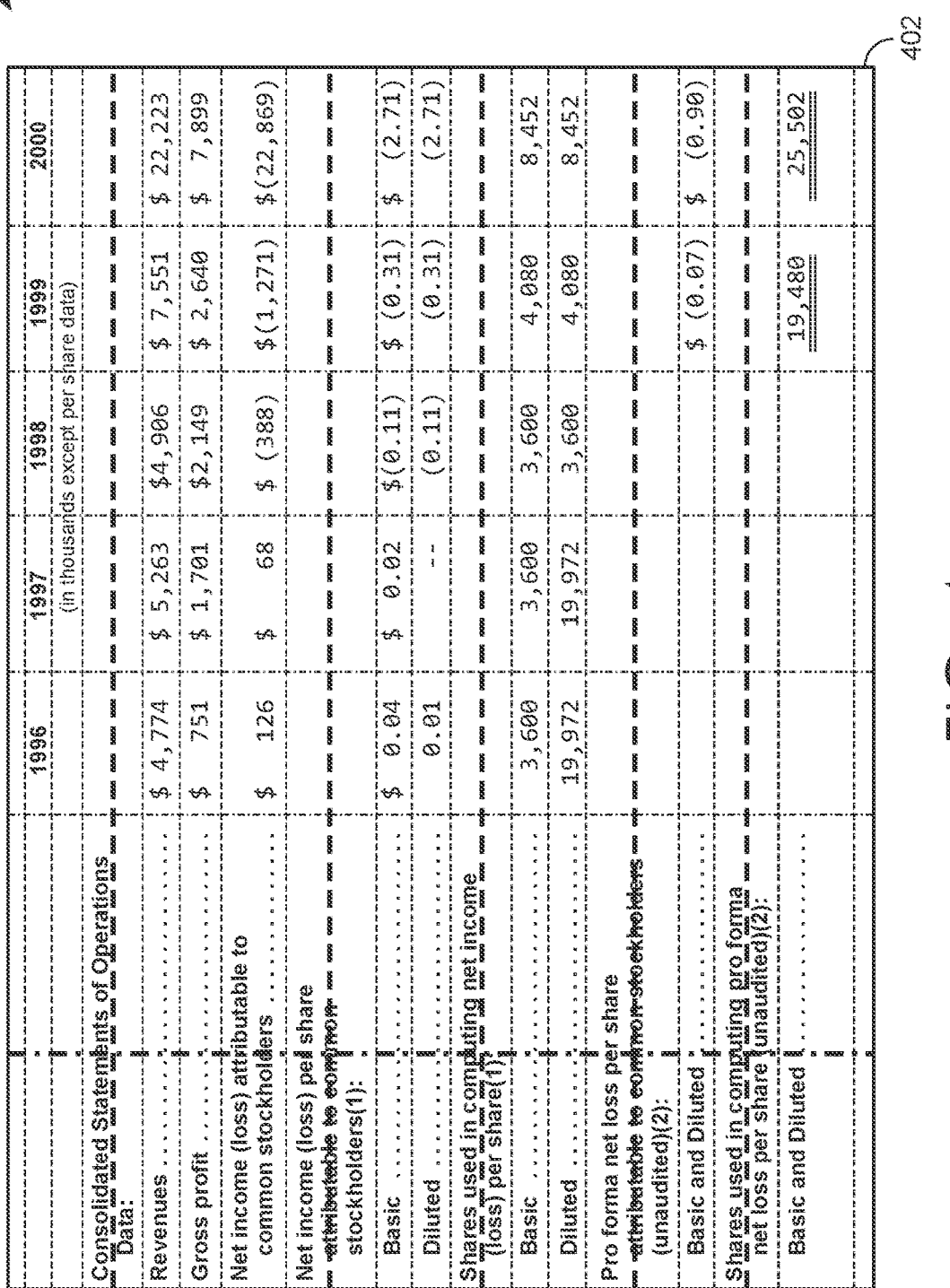

| Consolidated Statements of Operations Data: | 1996 | 1997 | 1998 | 1999 | 2000 |
|---|---|---|---|---|---|
| | | (in thousands except per share data) | | | |
| Revenues | $ 4,774 | $ 5,263 | $ 4,906 | $ 7,551 | $ 22,223 |
| Gross profit | $ 751 | $ 1,701 | $ 2,149 | $ 2,640 | $ 7,899 |
| Net income (loss) attributable to common stockholders | $ 126 | $ 68 | $ (388) | $ (1,271) | $ (22,869) |
| Net income (loss) per share attributable to common stockholders(1): | | | | | |
| Basic | $ 0.04 | $ 0.02 | $ (0.11) | $ (0.31) | $ (2.71) |
| Diluted | 0.01 | -- | (0.11) | (0.31) | (2.71) |
| Shares used in computing net income (loss) per share(1): | | | | | |
| Basic | 3,600 | 3,600 | 3,600 | 4,080 | 8,452 |
| Diluted | 19,972 | 19,972 | 3,600 | 4,080 | 8,452 |
| Pro forma net loss per share attributable to common stockholders (unaudited)(2): | | | | | |
| Basic and Diluted | | | | $ (0.07) | $ (0.90) |
| Shares used in computing pro forma net loss per share (unaudited)(2): | | | | | |
| Basic and Diluted | | | | 19,480 | 25,502 |

FIG. 4

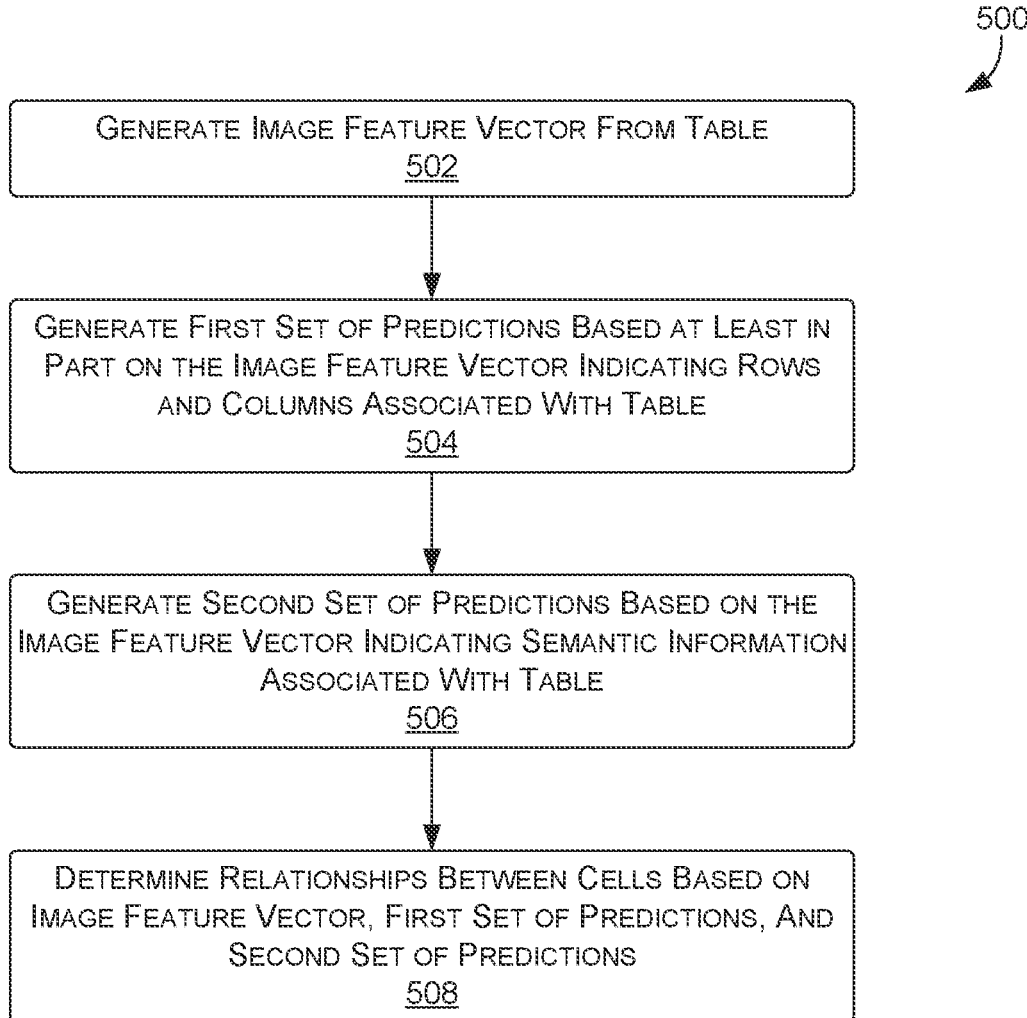

500

GENERATE IMAGE FEATURE VECTOR FROM TABLE
502

GENERATE FIRST SET OF PREDICTIONS BASED AT LEAST IN PART ON THE IMAGE FEATURE VECTOR INDICATING ROWS AND COLUMNS ASSOCIATED WITH TABLE
504

GENERATE SECOND SET OF PREDICTIONS BASED ON THE IMAGE FEATURE VECTOR INDICATING SEMANTIC INFORMATION ASSOCIATED WITH TABLE
506

DETERMINE RELATIONSHIPS BETWEEN CELLS BASED ON IMAGE FEATURE VECTOR, FIRST SET OF PREDICTIONS, AND SECOND SET OF PREDICTIONS
508

FIG. 5

600
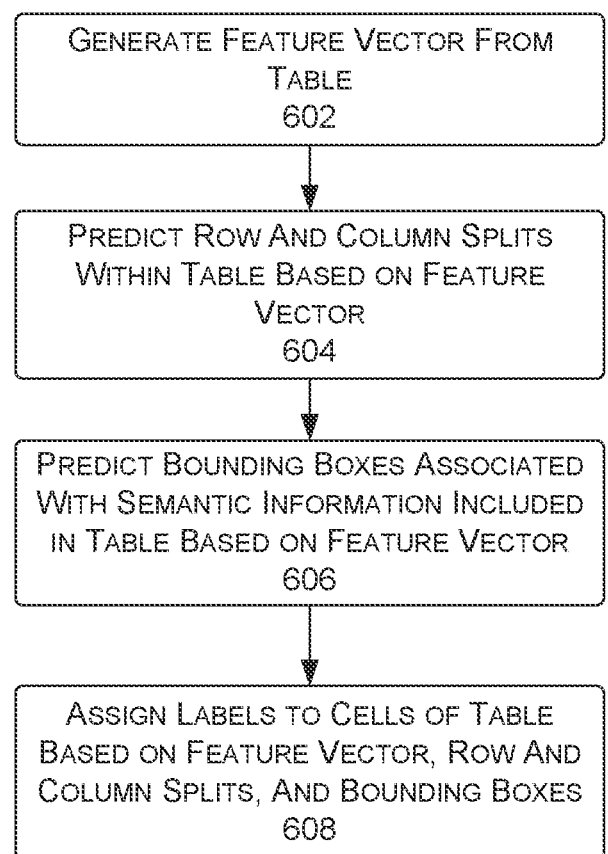
GENERATE FEATURE VECTOR FROM TABLE
602
↓
PREDICT ROW AND COLUMN SPLITS WITHIN TABLE BASED ON FEATURE VECTOR
604
↓
PREDICT BOUNDING BOXES ASSOCIATED WITH SEMANTIC INFORMATION INCLUDED IN TABLE BASED ON FEATURE VECTOR
606
↓
ASSIGN LABELS TO CELLS OF TABLE BASED ON FEATURE VECTOR, ROW AND COLUMN SPLITS, AND BOUNDING BOXES
608
FIG. 6

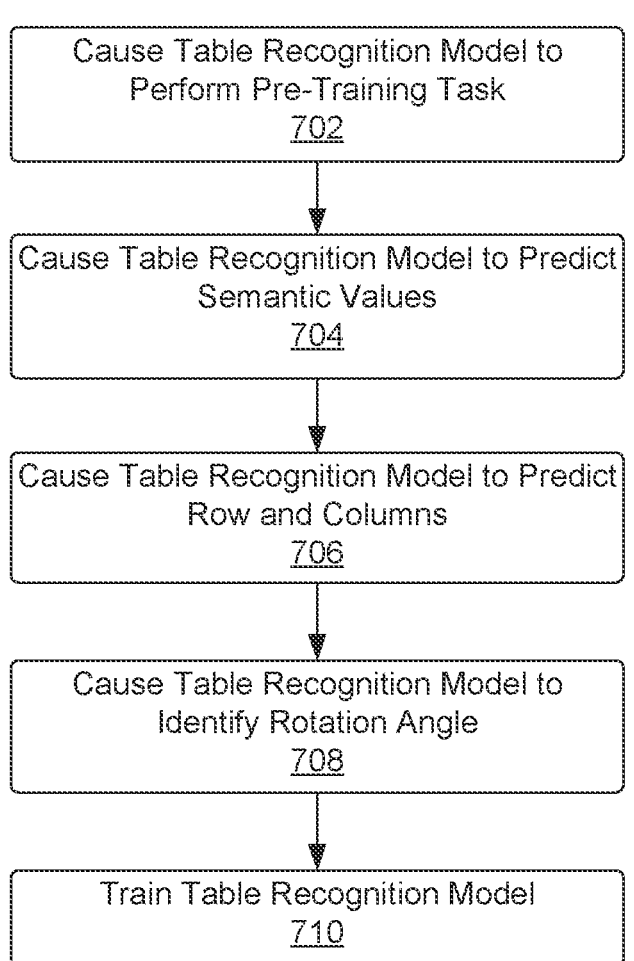
Cause Table Recognition Model to
Perform Pre-Training Task
702
Cause Table Recognition Model to Predict
Semantic Values
704
Cause Table Recognition Model to Predict
Row and Columns
706
Cause Table Recognition Model to
Identify Rotation Angle
708
Train Table Recognition Model
710
FIG. 7

IMAGE AND SEMANTIC BASED TABLE RECOGNITION

BACKGROUND

Documents formatted in a portable document format (PDF) are used to simplify the display and printing of structured documents. These PDF documents permit incorporation of a text and graphics in a manner that provides consistency in the display of documents across heterogeneous computing environments. In addition, it is often necessary to extract text and/or other information from a document to provide such consistency in the display of documents across heterogeneous computing environments. For example, tables can be formatted to include information in rows and columns for a first display device that may cause the information to be cut-off or not visible on a second display. Furthermore, the complexity and diversity of tables increases the difficulty of these tasks and require models to determine relationships between cells as well as determining information stored within the cells. To perform such tasks, existing tools (e.g., cell detection models) focus on a single cell of the table, which ignores relationships between cells and provides sub-optimal results when extracting information from the table.

SUMMARY

To extract semantic and structural information from a table, conventional technologies typically focus on an image-based table recognition. These methods extract the visual feature from table images without using the language information from the table thereby providing suboptimal results. As such, the present technology is directed towards a table recognition model that includes both an image-based table recognition and optical character recognition (OCR) based (e.g., semantic based) components. Specifically, the table recognition model utilizes transformer-based models (e.g., one encoder and three decoders) to extract visual, semantic, and relationship information from a table. First a vision transformer model takes an image of the table as an input and encodes an image feature vector which is then feed into three decoders, a split decoder, an OCR decoder, and a relationship decoder. The split decoder predicts rows and columns splits based on the image feature vector and generates one-dimensional information representing lines (e.g., a line representing a split between rows or column). The OCR decoder predicts words and two dimensional bounding boxes around the words. The intermediate results of the split decoder and the OCR decoder are provided to the relationship decoder which predicts the table structure and/or the structure of the cells (e.g., the final result).

In addition, the table recognition model is pretrained using several pre-training tasks to improve performance during inferencing. The first, a mask OCR token learning task includes masking the pixels corresponding to a bounding box for a randomly selected word and causing the model to predict the masked word. The cross-entropy loss between the model's predictions and the ground truth (e.g., the masked word) is then used to improve the model. The next two pre-training tasks include a split denoising task and a merge denoising task, in each task, rows and columns are split and/or merged at random. The model predicts missing or redundant rows and/or columns. Lastly, a table rotation task includes rotating the document and causing the model to identify the rotated angle.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 depicts a diagram of an environment in which a table recognition tool performs one or more pre-training tasks, in accordance with at least one embodiment.

FIG. 4 depicts a diagram of an environment in which a table recognition tool is used to perform one or more tasks, in accordance with at least one embodiment.

FIG. 5 depicts an example process flow for using a table recognition tool to perform one or more tasks, in accordance with at least one embodiment.

FIG. 6 depicts an example process flow for using a table recognition tool to perform one or more tasks, in accordance with at least one embodiment.

FIG. 7 depicts an example process flow for training a table recognition tool to perform one or more tasks, in accordance with at least one embodiment.

DETAILED DESCRIPTION

Figure 1:
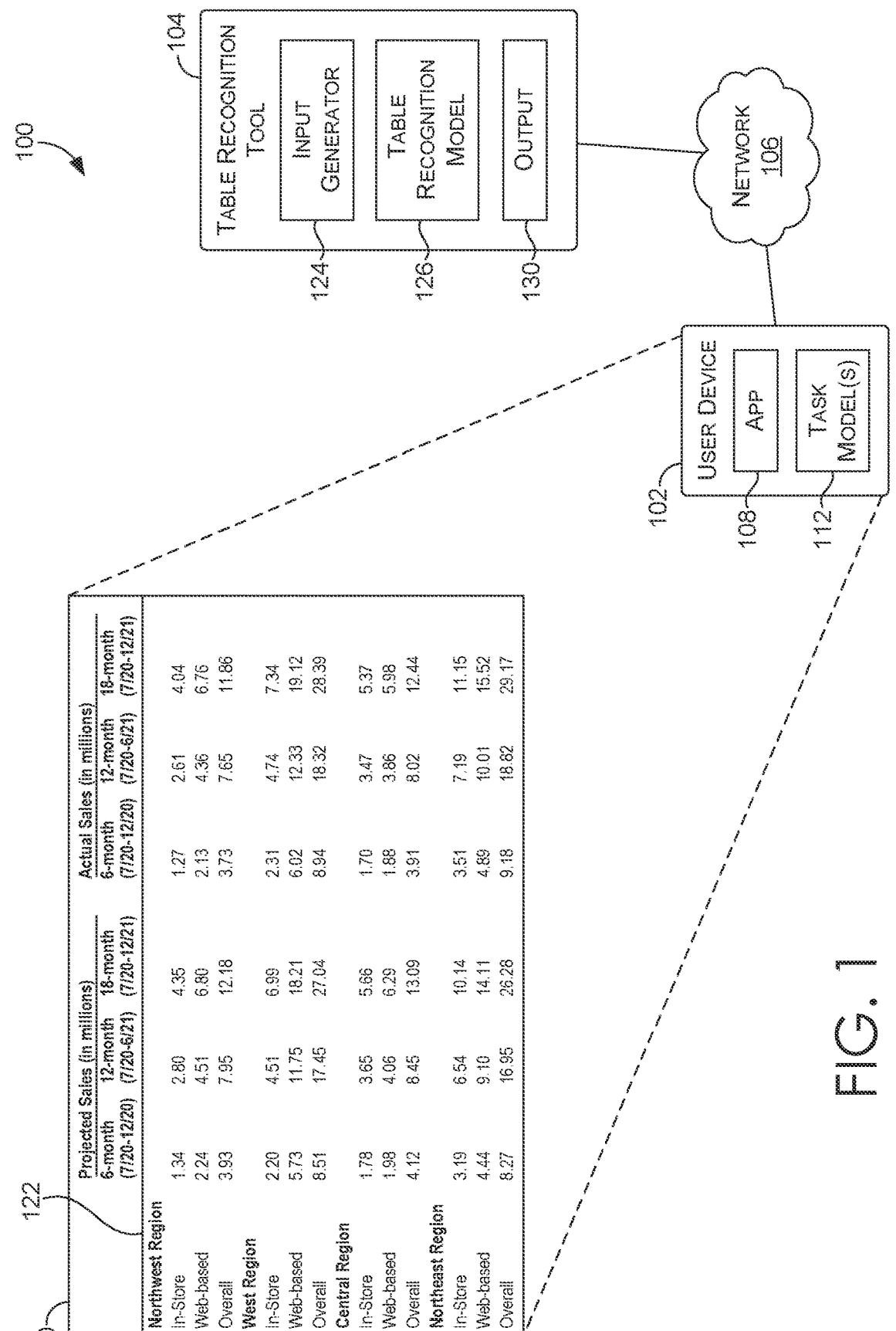
FIG. 1 depicts a diagram of an environment in which one or more embodiments of the present disclosure can be practiced.

Embodiments described herein are directed to extracting, using one or more machine learning models, information from a table used to perform one or more tasks. As such, the present technology is directed towards a table recognition model machine learning model (or simply a table recognition model) that includes both image-based and OCR-based components. In one example, the table recognition model includes a transformer network that uses a vision encoder to extract visual features from an image of a table, a split decoder to extract rows and columns splits, and an OCR decoder to extract semantic information (e.g., bounding boxes and semantic features). In an embodiment, the table recognition model generates final predictions about the table (e.g., assign labels to cells of the table, determines table structure, determines cell structure, or other information associated with the table) based at least in part on a result from a relationship decoder that takes inputs from the vision encoder, split decoder, and OCR decoder. In addition, in various embodiments, several pre-training tasks are used to improve performance during inferencing. For example, a first pre-training task includes a mask OCR token learning task which masks pixels corresponding to a bounding box for selected word(s) and causes the table recognition model to predict the masked word(s). In such examples, a cross-entropy loss between the predictions and the ground truth (e.g., the masked word) is then used to improve the model. In another example, the pre-training tasks include split denoising task and merge denoising task, in which rows and columns are split or merged and the table recognition model predicts missing or redundant rows and/or columns. Furthermore, the table recognition model, in an embodiment, performs a table rotation task which includes rotating the document (e.g., the document including the table or the table itself) and causing the table recognition model to identify a rotated angle of the document.

Advantageously, the table recognition model provides a single model that can extract both visual and semantic features from table and/or images of tables. In addition, transform-based decoders provide improved performance in predicting which elements belong to particular cells and the relationship between cells. For example, when determining cells associated with a particular span (e.g., section title or header within a table). Furthermore, the table recognition model supplements traditional image only based table recognition models with OCR information (e.g., semantic and bounding box information) to improve inferencing. For example, the relationship decoder of the transformer network is able to reason about all cells together using pair-wise relations between cells (e.g., using the output of the OCR decoder and row/column split decoder) while being able to use the whole image as context (e.g., image feature vector). As a result, the output of the table recognition model provides improved performance when performing various tasks associated with the table such as table question answering, table fact verification, table formatting for different display devices, and table captioning. Furthermore, various pre-training tasks are used to improve inferences and enable end-to-end operation of the table recognition model.

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1 is an example of one suitable operating environment. Among other components not shown, operating environment 100 includes a user device 102, a table recognition tool 104, and a network 106. Each of the components shown in FIG. 1 may be implemented via any type of computing device, such as one or more computing devices 800 described in connection with FIG. 8, for example. These components may communicate with each other via network 106, which may be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 106 is not described in significant detail.

It should be understood that any number of devices, servers, and other components may be employed within operating environment 100 within the scope of the present disclosure. Each may comprise a single device or multiple devices cooperating in a distributed environment.

User device 102 can be any type of computing device capable of being operated by an entity (e.g., individual or organization) associated with a document 120 including a table 122 from which information is to be extracted and/or one or more tasks are to be performed (e.g., table question answering, table fact verification, table formatting, table layout, table identification, table captioning, etc.). The user device 102, in various embodiments, has access to or otherwise maintains documents (e.g., the document 120) from which information is to be extracted. For example, the user device 102 includes a mobile device displaying the document 120 including the table 122.

In some implementations, user device 102 is the type of computing device described in connection with FIG. 8. By way of example and not limitation, a user device 102 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 108 shown in FIG. 1. Application 108 is referred to as a single application for simplicity, but its functionality can be embodied by one or more applications in practice.

The application(s) 108 may generally be any application capable of facilitating the exchange of information between the user device 102 and the table recognition tool 104 in carrying out one or more tasks that include information extracted from the document 120 and/or table 122. For example, the application 108 can modify or otherwise format the table 122 in the document 120 for display on a display device connected to the user device 102. In such an example, the height and width values of the cells of the table 122 are modified to fit within the display based on information extracted from the document 120 and/or table 122 by the table recognition model 126. In some implementations, the application 108 comprises a web application, which can run in a web browser, and can be hosted at least partially on the server-side of the operating environment 100. In addition, or instead, the application 108 can comprise a dedicated application, such as an application being supported by the user device 102 and the table recognition tool 104. In some cases, the application 108 is integrated into the operating system (e.g., as a service). It is therefore contemplated herein that "application" be interpreted broadly. Some example applications include ADOBE® SIGN, a cloud-based e-signature service, and ADOBE ACROBAT®, which allows users to view, create, manipulate, print, and manage documents.

In accordance with embodiments herein, the application 108 facilitates the generation of an output 128 of a table recognition model 126 that can be used to perform various tasks associated with the document 120 and/or table 122. For example, user device 102 may provide the document 120 and indicate one or more tasks to be perform based on the table 122 included in the document 120. Although, in some embodiments, a user device 102 may provide the document 120, embodiments described herein are not limited hereto. For example, in some cases, an indication of various tasks that can be performed on the table 122 included in the document 120 may be provided via the user device 102 and, in such cases, the table recognition tool 104 may obtain the document 120 from another data source (e.g., a data store). In yet other embodiments, another service and/or application extracts or otherwise provides the table 122 to the table recognition model 126.

The table recognition tool 104 is generally configured to generate the output 128 which can be used by one or more task models 112, as described in greater detail below, to perform various tasks associated with the document 120 and/or table 122. For example, as illustrated in FIG. 1, the document 120 includes the table 122 for which the task is to be performed and/or information is to be extracted as indicated by the user through the application 108 and/or the one or more task models 112 executed by the user device 102. At a high level, to perform the various tasks, the table recognition tool 104 includes an input generator 124, the table recognition model 126, and an output 128. The input generator 124 may be or include an input embedding layer as described in greater detail below, for example, in connection with FIG. 2. In various examples, the input generator 124 may obtain textual and/or image features and corresponding bounding boxes extracted from the document 120 and/or the table 122. In such examples, the input generator 124 generates input feature vectors that encode features and/or other information obtained from the document 120 and/or the table 122. For example, as described in greater detail below, the input generator 124 includes an encoder of a transformer model that processes an image of the table 122 as a sequence of patches which are flattened into vectors and linearly projected to patch embeddings. In various embodiments, the input generator 124 extracts information (e.g., the features) from the document 120 and/or the table 122. In yet other embodiments, one or more other machine learning models (e.g., OCR, convolutional neural network (CNN), recurrent neural network (RNN), Transformer network, feedforward neural network (FFN), etc.) are used to extract information from the document 120 and/or the table 122 and provide to the input generator 124 to generate an input for the table recognition model 126. Furthermore, the input generator 124, in an embodiment, generates the input based on information extracted from the document 120 and/or the table 122.

In various embodiments, the input generator 124 provides the generated input to the table recognition model 126 and, based on the generated input, the table recognition model 126 generates the output 128. As described in greater detail in connection with FIG. 2, in some embodiments, the table recognition model 126 includes a transformer network with one encoder (e.g., input generator 124) and three decoders: a split decoder, an OCR decoder, and a relationship decoder. In an embodiment, the output 128 is a feature vector (e.g., containing values from the input feature vectors transformed/encoded by the table recognition model 126) that is useable by the one or more task models 112 to perform various task associated with the document 120 and/or table 122. In various examples, the output 128 indicates relationships between cells of the table 122 to enable the one or more task models 112 to perform various tasks such as table question answering, table fact verification, table formatting, table layout, table identification, and table captioning. In various embodiments, the table recognition tool 104 transmits the output 128 over the network 106 to the user device 102 for use by the one or more task models 112. Furthermore, although the one or more task models 112, as illustrated in FIG. 1, are executed by the user device 102, in various embodiments, all or a portion of the one or more task models 112 are executed by other entities such as a cloud service provider, a server computer system, and/or the table recognition tool 104.

For cloud-based implementations, the application 108 may be utilized to interface with the functionality implemented by the table recognition tool 104. In some cases, the components, or portion thereof, of table recognition tool 104 may be implemented on the user device 102 or other systems or devices. Thus, it should be appreciated that the table recognition tool 104 may be provided via multiple devices arranged in a distributed environment that collectively provide the functionality described herein. Additionally, other components not shown may also be included within the distributed environment.

Figure 2:
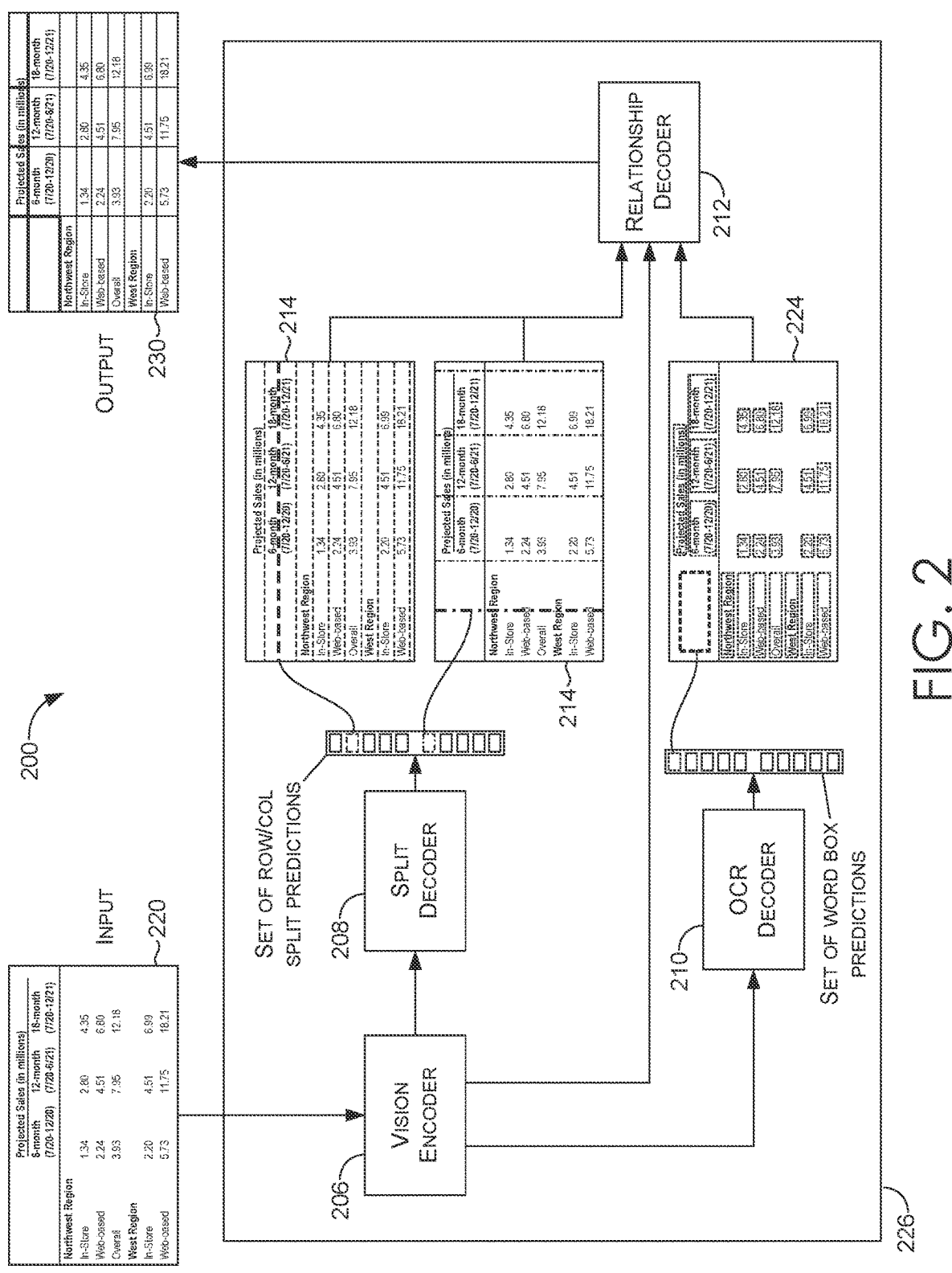
FIG. 2 depicts a diagram of a table recognition tool, in accordance with at least one embodiment.

Turning to FIG. 2, FIG. 2 is a diagram of an environment 200 in which a table recognition model 226 is trained and/or used to generate output feature vectors and/or other information that can be used to perform various tasks associated with a table in accordance with at least one embodiment. In various embodiments, the table recognition model 226 is a transformer network including a vision encoder 206, a split decoder 208, an OCR decoder 210, and a relationship decoder 212.

In various embodiments, the vision encoder 206 includes a transformer encoder that generates an output (e.g., embeddings) based on an input image I. For example, the input image may include an entire document (e.g., a PDF) including a table, a portion of a document corresponding to a table, and/or an image of the table itself (e.g., extract from a document or other data object). In various embodiments, the vision encoder 206 processes the input image as a sequence of patches. In one example, the input image $I \in \mathbb{R}^{3 \times H \times W}$ is decomposed into a batch of $N=HW/P^2$ patches of size P×P, where H and W are a height and widths after resizing such that the values are divisible by the patch size P. In an embodiment, the patches are flattened (e.g., converted) into vectors which are linearly projected to generate the embeddings (e.g., inputs into other components of the transformer model such as the split decoder 208, the OCR decoder 210, and the relationship decoder 212).

In various embodiments, the decoders (e.g., the split decoder 208, the OCR decoder 210, and the relationship decoder 212) of table recognition model 226, transform N embeddings of size d using multi-headed self-attention mechanisms. Furthermore, the decoders are permutation-invariant in an embodiment. For example, the N embeddings used as an input to a decoder must be different to produce different results. In an embodiment, the N embeddings include learned positional encodings that are added to the input of the attention layers of the decoder. In one example, the N embeddings are transformed into an output embedding by the split decoder 208. In addition, in an embodiment, the decoders (e.g., the split decoder 208 and OCR decoder 210) utilize seeds to generate candidate predictions (e.g., set of row and/or column split predictions 214). In an example, the seeds include a fixed length feature vector.

In various embodiments, the split decoder 208 generates predictions representing row and column splits 214 of the table 220. In one example, the predictions include one-dimensional information indicating coordinate(s) of a line within the table 220 indicating a row or column (illustrated with dashed lines in FIG. 2). In addition, the OCR decoder 210, in an embodiment, generates predictions indication semantic information within the table (e.g., cell values) and corresponding bounding boxes 224 (illustrated with dashed lines in FIG. 2). In various embodiments, the relationship decoder 212, using the results of the split decoder 208 and the OCR decoder 210, predicts a class label for cells of the table 220. For example, the output (e.g., the N embeddings), the split decoder 208, and the OCR decoder 210 are independently decoded into bounding box coordinates and class labels are assigned by a FFN (e.g., the relationship decoder 212) resulting in N output predictions (e.g., output 230). In various embodiments, using self-attention encoders and decoders (e.g., the vision encoder 206, split decoder 208, the OCR decoder 210, and the relationship decoder 212), the table recognition model 226 is able to globally reason about all cells of the table 220 using pair-wise comparisons between the cells while being able to use the whole image (e.g., the input image of the table 220) as context. In an embodiment, the final prediction layers of the decoders (e.g., the split decoder 208, the OCR decoder 210, and the relationship decoder 212) are different. In addition, while in the example illustrated in FIG. 2, one encoder and three decoders are shown, any number of encoders and decoders can be included in the table recognition model 226.

In one embodiment, the output 230 (e.g., final predictions of the table recognition model 226) is computed using a 3-layer perceptron with a Rectified Linear Unit (ReLU) activation function, hidden dimension d, and a linear projection layer. In an embodiment, with respect to the split decoder 208, the FFN predicts the normalized row and/or column coordinates based at least in part on the input image (e.g., features extracted from the table 220 by the vision encoder 206). In yet another embodiment, with respect to the OCR decoder 210, the FFN predicts the center coordinates, height value, and width value of the bounding box corresponding to a cell of the table 220 and/or a semantic value in the table based on the input image (e.g., features extracted from the table 220 by the vision encoder 206). In addition, in such embodiments, the OCR decoder 210 includes the linear layer that predicts the semantic information using a softmax function. In one example, as a result of the decoders predicting a fixed-size set of lines (e.g., the split decoder 208) or bounding boxes (e.g., the OCR decoder 210), where the fixed-size is larger than the actual number of lines and/or words included in the table 220, an additional class label is used to represent that no object is detected within a cell.

In various embodiments, the relationship decoder 212 takes as an input a concatenation of the feature vectors generated by the vision encoder 206, split decoder 208, and OCR decoder 210 to generate the output 230. As a result of combining semantic and visual feature information, in such embodiments, the table recognition model 226 is a multi-modal model. For example, the table recognition model 226 utilizes semantic information indicating grouping of words to determine candidate cells. In one such specific example, a group of words indicates a heading of a section of the table 220 or an individual cell of the table 220.

FIG. 3 is a diagram of an environment 300 in which a table recognition model performs a set of pre-training tasks in accordance with at least one embodiment. In various embodiments, a training dataset (e.g., a dataset including ground truth information) is used to generate a set of inputs to the table recognition model. For example, a set of features (e.g., visual embeddings, linguistic embeddings, etc.) and bounding boxes indicating regions of a set of documents (e.g., PDFs including tables) are extracted using a vision encoder to create an input to one or more decoders of the table recognition model (e.g., such as the inputs described above in connection with FIG. 2).

In various embodiments, during a pre-training phase, various pre-training operations are performed using the output of the table recognition model or components thereof (e.g., vision encoder, split decoder, OCR decoder, relationship decoder, etc.). In various embodiments, the set of pre-training tasks include a masked OCR token task 302, a split denoising task 304, a merge denoising task 306, and a table rotation task 308. Additional pre-training tasks can be performed in accordance with other embodiments. In addition, certain pre-training tasks can be omitted in some embodiments.

In one example, the masked OCR token task 302 includes masking a cell value (e.g., a word within a table illustrated in FIG. 3 with a black box) within images representing tables included in the training dataset. In various embodiments, masking the cell value includes modifying a set of pixels corresponding to a bounding box representing the cell. For example, the set of pixel corresponding to bounding box 312 are modified such that the pixel values are set of zero. Other pixel values (e.g., a maximum pixel value) or mechanisms for masking the cell such that the cell value cannot be obtained by the table recognition model can be using in accordance with other embodiments. To perform the masked OCR token task 302, in accordance with an embodiment, the table recognition model or component thereof (e.g., the OCR decoder) predicts the masked cell value and the corresponding bounding box 312. For example, the OCR decoder predicts cell values and bounding boxes for masked cells in a set of tables and/or documents, the predicted cell values are then compared to the ground truth (e.g., information associated with the training dataset) using a cross-entropy loss function or other function to train the table recognition model.

In various embodiments, the split denoising task 304 is used to train the split decoder. In one example, row and/or column splits are added and/or removed from the training dataset (illustrated in FIG. 3 with a dashed line) and the table recognition model or component thereof (e.g., split decoder) predicts missing and/or redundant row and/or column splits. In various embodiments, row and/or column splits are randomly, pseudorandomly, or otherwise added to tables in the training dataset. In various embodiments, the table recognition model predicts missing or redundant rows and/or or columns and a binary classification loss function is used to train the table recognition model. For example, the split decoder predicts missing and/or redundant rows and/or columns, these predictions are than compared to the ground truth (e.g., using the binary classification loss function, binary cross-entropy, or other binary function) and used to train the split decoder. In various embodiments, the predictions are either true or false. For example, the table recognition model predicts which locations within the tables include missing and/or redundant inputs.

In an embodiment, similar to the split denoising task 304 described above, a merge denoising task 306 is used to train the split decoder. In one example, a span (e.g., a set of merged rows and/or columns) is added and/or removed from the training dataset (illustrated in FIG. 3 with a dashed line) and the table recognition model or component thereof (e.g., split decoder) predicts missing and/or redundant spans. In various embodiments, the predictions are then compared to the ground truth as described above with the split denoising task 304. For example, a binary classification loss function is used to compare the predictions generated by the split decoder with the ground truth information included in the training dataset. In other embodiments, the split denoising task 304 and the merge denoising task 306 are combined into a single pre-training task.

In an embodiment, a table rotation task is performed by the table recognition model to train the relationship decoder or other component of the table recognition model. For example, one or more tables included in the training dataset are rotated one or more angles along an axis as illustrated in FIG. 3. The one or more tables and one or more angles, in various embodiments, are selected uniformly, randomly, and/or pseudorandomly. In various embodiments, the table recognition model or the relationship decoder predicts the rotated angle and/or identifies that the table has been rotated. Furthermore, the prediction (e.g., that the table is rotated) is compared to the ground truth to train the table recognition model or component thereof. For example, a binary classification loss function is used to compare the predictions generated by the relationship decoder with the ground truth information included in the training dataset.

FIG. 4 is a diagram of an environment 400 in which a table recognition model generates an output 402 in accordance with at least one embodiment. For example, the table recognition model as described above in connection with FIG. 2, generates the output 402 (e.g., a set of predictions indicating information associated with a table such as the table structure and/or labels associated with cells of the table) based on an input (e.g., an image of a table). In an embodiment, the output 402 includes predicted rows and columns, class labels associated with cells, relationships between cells, and/or other information extracted from the table. In an example, the output 402 is used to perform one or more tasks associated with the table such as table question answering, table fact verification, table formatting, table layout, table identification, table captioning.

In other embodiments, the output 402 is used to fine tune the table recognition model. In one example, a set-based bipartite matching between predictions included in the output 402 (e.g., row and column split predictions) and ground truth target (e.g., information included in a training dataset used to generate the output 402) is perform to determine whether the predictions are associated with the ground truth targets (e.g., an existing split segment or not). In such examples, assuming there are N predictions $\{(p^i, \hat{L}^i);$ i=1, . . . , N$\}$ and M ground truth targets $\{L^{(j)}; j=1, . . . , M\}$, a bipartite matching objective is optimized on a permutation function $\sigma(\bullet);$ $\mathbb{Z}_+\to\mathbb{Z}_+$ which maps prediction indices $\{1, . . . , N\}$ to potential target indices $\{1, . . . , N\}$ (e.g., including $\{1, . . . , M\}$ for ground truth targets and $\{M+1, . . . , N\}$ for unmatched predictions):

$$\mathcal{L}_{match} = \sum_{i=1}^{N} 1_{\{\sigma(i)\le M\}}\left[\lambda_1 d\left(\hat{L}^{(i)}, L^{(\sigma(i))}\right) - \lambda_2 p^{(i)}\right]$$

where $d(\bullet,\bullet)$ represents the $L_1$ distance between coordinates (e.g., two dimensional coordinates corresponding to a bounding box and/or one dimensional coordinates correspond to a row or column) and $1_{\{\bullet\}}$ is an indicator function. In addition, $p^i$ represents the probability and $\hat{L}^i$ indicates the location. In various embodiments, the bipartite matching is used to determine the lowest loss value between the predictions included in the output 402 and the ground truth. For example, the $\mathcal{L}_{match}$ takes both distance and confidence into account with balancing coefficients $\lambda_1$, $\lambda_2$. In an embodiment, the optimal permutation $\sigma^*$ is computed using a Hungarian algorithm or similar algorithm, mapping M positive prediction indices to ground truth target indices $\{1, . . . , M\}$. During inferencing, for example, the N predictions (e.g., row and column split predictions) are filtered by setting a fixed threshold on the confidence $p^{(i)}$ if no ground truth targets are provided.

In addition, a relationship prediction loss, in various embodiments, is determined and used to fine tune the table recognition model. For example, based on a merge prediction (e.g., a prediction to merge two or more rows and/or columns into a span), the relationship prediction loss can be determined by at least generating a relationship proposal (e.g., a pairwise relationship between cells predicted by the relationship decoder) based on candidate cells generated by the split decoder and determining a binary classification loss based on the relationship proposal and the ground truth.

In various embodiments, a bounding box loss is determined using a loss function. In one example, the $\ell_1$ loss for a predicted bound box is determined based on the ground truth to fine tune the table recognition model. In such examples, the $\ell_1$ loss function will have different scales for small and large bounding boxes even if their relative errors are similar. In yet other embodiments, a linear combination of the $\ell_1$ loss and an intersection over union (IoU) loss that is scale-invariant is used to fine tune the table recognition model. For example, bounding box loss (e.g., $b_{i,\sigma(i)}$) is defined as $\lambda_{IoU}b_{i,\sigma(i)}+\lambda_{L1}\|b_i-\sigma(i)\|_1$ where $\lambda_{IoU}$ and $\lambda_{L1}$ are hyperparameters. In an embodiment, these two losses are normalized based on the number of predictions inside a batch.

Turning now to FIG. 5, FIG. 5 provides illustrative flows of a method 500 for determining a set of relationships between cells of a table using a table recognition model in accordance to at least one embodiment. Initially, at block 502, the system executing the method 500 causes the table recognition model to generate an image feature vector from a table. In one example, a vision encoder of the table recognition model generates an image feature vector based at least in part on an image of the table included in a document. In various embodiments, as described above in connection with FIG. 2, the vision encoder is a component of the table recognition model that processes an input image of the table to generate the image feature vector.

At block 504, the system executing the method 500 generates a first set of predictions based at least in part on the image feature vector. In an embodiment, the first set of predictions indicates row and or columns associated with the table. For example, the set of predictions include coordinates corresponding to a line representing a row and/or column within the table. In various embodiments, the first set of predictions is generated by a split decoder of the table recognition model.

At block 506, the system executing the method 500 generates a second set of predictions based at least in part on the image feature vector. In an embodiment, the second set of predictions indicates semantic information associated with the table. For example, an OCR decoder as described above in connection with FIG. 2 generates semantic information and bounding box information based at least in part on the image feature vector. In various embodiments, the first set of predictions and the second set of predictions include feature vectors.

At block 508, the system executing the method 500 determines relationships between cells of the table based at least in part on the image feature vector, the first set of predictions, and the second set of predictions. For example, as described above in connection with FIG. 2, a relationship decoder of the table recognition model determines the relationship between cells by at least performing a pair-wise comparison of the cells of the table. In various embodiments, the image feature vector, the first set of predictions, and the second set of predictions are concatenated and provided as an input to the relationship decoder. Furthermore, in various embodiments, the relationship decoder includes a self-attention layer that performs self-attention across the input (e.g., the result of concatenating the image feature vector, the first set of predictions, and the second set of predictions).

Turning now to FIG. 6, FIG. 6 provides illustrative flows of a method 600 for assigning labels to cells of a table using a table recognition model in accordance to at least one embodiment. Initially, at block 602, the system executing the method 600 causes the table recognition model to generate a feature vector from the table. In one example, a CNN or other network takes as an input an image of the table. In another example, the table recognition model is a transformer network and includes a vision encoder, as described above in connection with FIG. 2, which generates the feature vectors based at least in part on an input image representing the table.

At block 604, the system executing the method 600 predicts row and column splits within the table based at least in part on the feature vector. In various embodiments, the table recognition model predicts the location of row and column splits within the table based at least in part on the feature vector extracted from the image. For example, the predictions include coordinates of a line representing predicted row and/or column splits within the table. In various embodiments, the predicted row and column splits are encoded in a feature vector.

At block 606, the system executing the method 600 predicts bounding boxes associated with semantic information included in the table based at least in part on the feature vector. In various embodiments, an OCR decoder generates a feature vector including semantic information and bounding boxes corresponding to textual information included in the table.

At block 608, the system executing the method 600 assigns labels to cells of the table based at least in part on the feature vector, row and column splits, and bounding boxes. In various embodiments, a relationship decoder of the table recognition model assigns labels to cells by at least performing a pair-wise comparison of cells of the table. For example, the relationship decoder assigns the label "background" to an empty cell used to provide spacing within the table. In another example, the relationship decoder assigns the label "heading" for a cell that contains a heading for a set of rows within the table.

Turning now to FIG. 7, FIG. 7 provides illustrative flows of a method 700 for training a table recognition model in accordance to at least one embodiment. Initially, at block 702, the system executing the method 700 causes the table recognition model to perform one or more pre-training tasks. In one example, the pre-training tasks include tasks described in greater detail above in connection with FIG. 3.

At block 704, the system executing the method 700 causes the table recognition model to predict semantic values associated with cells of the table. In various embodiments, a pre-training tasks includes using a mask OCR token task which includes masking a value within a table and causing the table recognition model to predict the value. As described above, the predicted values are compared to the ground-truth, for example, using a cross-entropy loss value which is used to improve inferencing by the table recognition model.

At block 706, the system executing the method 700 causes the table recognition model to predict row and column splits associated with the table. In various other embodiments, a pre-training tasks includes split and/or merge denoising tasks. For example, rows and/or columns are added or removed from the table and the table recognition model determines missing and/or redundant rows and/or columns. In such embodiments, a binary loss function is used to improve prediction generated by the table recognition model.

At block 706, the system executing the method 700 causes the table recognition model to identify an angle of rotation of the table. In various embodiments, a pre-training task includes a table rotation task in which images representing the table are rotated and the table recognition model determines that the table is rotated. Similar to above, in such embodiments, a binary loss function is used to improve predictions generated by the table recognition model.

At block 710, the system executing the method 700 trains the table recognition model. In various embodiments, training the table recognition model includes providing the table recognition model with a set of training data objects (e.g., documents including tables) for processing. For example, the table recognition model is provided, as an input, a set of documents including tables and extracts at set of features associated with the table. In various embodiments, one or more fine-tuning tasks are performed such as bipartite matching.

Figure 8:
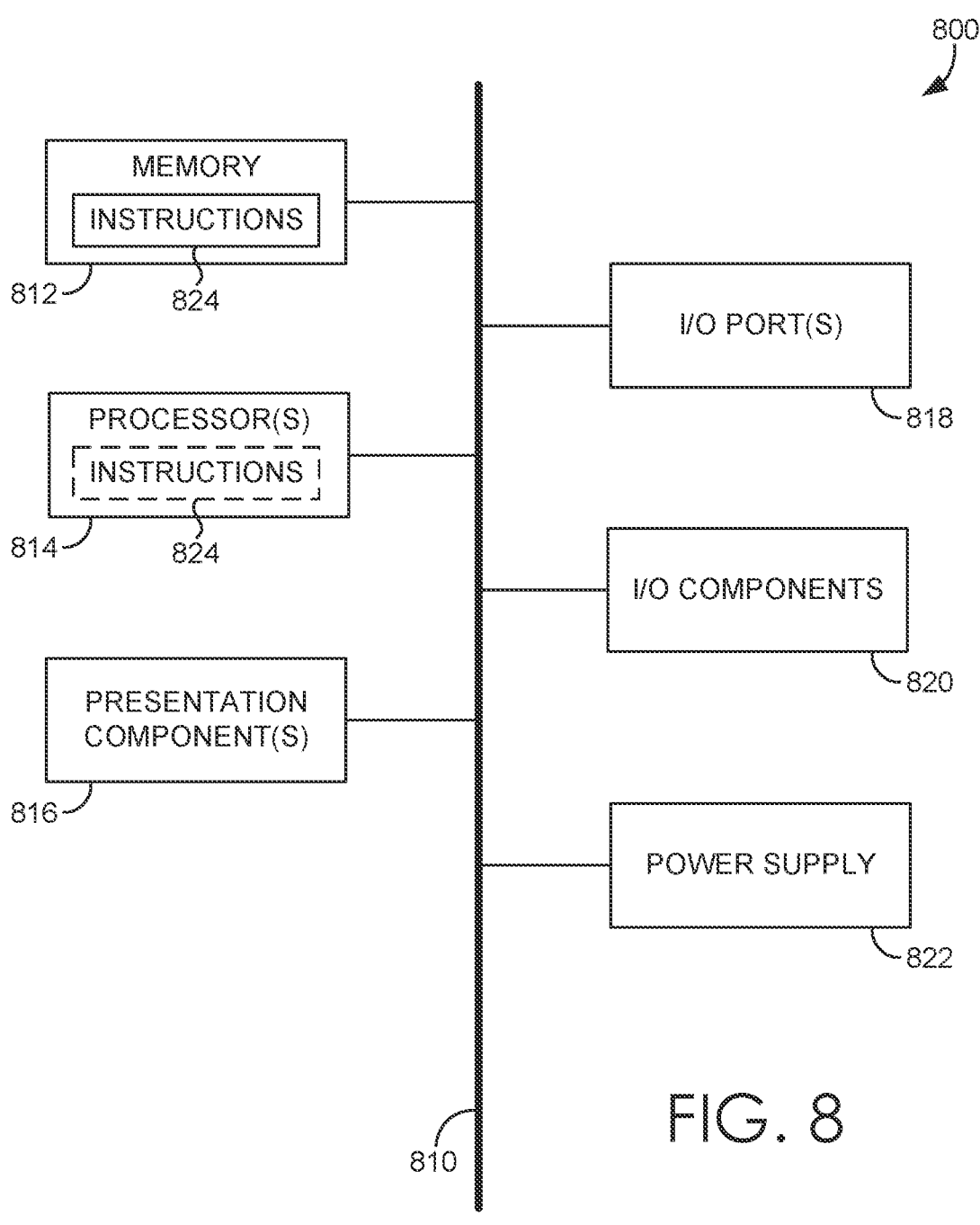
FIG. 8 is a block diagram of an exemplary computing environment suitable for use in implementations of the present disclosure.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present technology. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method comprising:
receiving an image of a table;
generating, using a first encoder of a table recognition machine learning model, an image feature vector including features extracted from the image of the table;
generating, using a first decoder of the table recognition machine learning model and the image feature vector, a set of coordinates within the image representing rows and columns associated with the table;
generating, using a second decoder of the table recognition machine learning model and the image feature vector, a set of bounding boxes and semantic features associated with cells the table, wherein the second decoder includes an optical character recognition (OCR) decoder; and
determining, using a third decoder of the table recognition machine learning model, a table structure associated with the table using the image feature vector, the set of coordinates, the set of bounding boxes, and the semantic features.

2. The method of claim 1, wherein the table structure further comprises a label associated with a cell of the table.

3. The method of claim 1, wherein the table recognition machine learning model includes a transformer network.

4. The method of claim 1, wherein the first decoder includes a self-attention layer.

5. The method of claim 1, wherein the method further comprises performing a task based on the table structure, the task including at least one of: table question answering, table fact verification, table formatting, table manipulation, and table captioning.

6. The method of claim 1, wherein determining the table structure further comprises determine a relationship between the cells of the table by at least performing a pair-wise comparison of features associated with the cells of the table.

7. The method of claim 1, wherein the method further comprises fine tuning the table recognition machine learning model by at least performing a bipartite matching between predictions generated by the table recognition machine learning model and a ground truth associated with the table.

8. The method of claim 1, wherein the method further comprises causing the table recognition machine learning model to execute a self-supervised pre-training task based on the table.

9. The method of claim 8, wherein the self-supervised pre-training task further comprises causing the table recognition machine learning model to predict semantic information based on a modified image of the table generated by at least masking a set of pixels of the image corresponding to a cell of the table.

10. A non-transitory computer-readable medium storing executable instructions embodied thereon, which, when executed by a processing device, cause the processing device to perform operations comprising:

determining, using a table recognition machine learning model, a first set of features based on an input image depicting a table;

determining, based on the first set of features, a first set of predictions representing rows and columns associated with the table;

determining, based on the first set of features, semantic information included in the table and a set of bounding boxes corresponding to the semantic information;

determining, using the table recognition machine learning model, a set of labels associated with cells of the table based on the first set of feature, the first set of predictions, the semantic information, and the set bounding boxes; and causing the table recognition machine learning model to execute a self-supervised pre-training task based on the table by at least causing the table recognition machine learning model to predict at least a portion of the semantic information based on a modified image of the table generated by at least masking a set of pixels of the image corresponding to a cell of the table.

11. The medium of claim 10, wherein determining the first set of features is performed by an encoder of the table recognition machine learning model.

12. The medium of claim 10, wherein determining the set of labels is performed by a decoder of the table recognition machine learning model.

13. The medium of claim 10, wherein the self-supervised pre-training task further comprises causing the table recognition machine learning model to predict a modification to a row or a column of the table.

14. The medium of claim 13, wherein the modification includes at least one of: merging rows of the table, adding rows to the table, merging columns of the table, adding columns to the table, merging spans of the table, and adding spans to the table.

15. The medium of claim 10, wherein the self-supervised pre-training task further comprises causing the table recognition machine learning model to predict a rotated angle associated with the table based on the input image.

16. A system comprising:

a memory component; and a processing device coupled to the memory component, the processing device to perform operations comprising:

pre-training a table recognition machine learning model by at least causing the table recognition machine learning model to perform a set of self-supervision tasks to generate a pre-trained table recognition machine learning model, wherein the set of self-supervision tasks includes at least:

predicting semantic values corresponding to a cell of a table based on a set of masked pixels included in an image of the table corresponding to the cell;

predicting a set of column and a set of row associated with the table based on modifications to rows and columns of the table; and identifying a rotated angle associated with a table based on a rotated image of the table;

training the pre-trained table recognition machine learning model by at least fine tuning the pre-trained table recognition machine learning model to generate a trained table recognition machine learning model; and using the trained table recognition machine learning model to perform a task.

17. The system of claim 16, wherein the table recognition machine learning model includes a transformer network.

18. The system of claim 16, wherein fine tuning the pre-trained table recognition machine learning model further comprises performing a bipartite matching between predictions generated by the pre-trained trained table recognition machine learning model and a ground truth associated with the table.

19. The system of claim 16, wherein fine tuning the pre-trained table recognition machine learning model further comprises performing binary classification based on a result of predicting the set of columns and the set of rows and a ground truth associated with the table.

20. The system of claim 16, wherein the task includes at least one of: table question answering, table fact verification, table formatting, table manipulation, and table captioning.

\* \* \* \* \*